(No Model.)

W. W. RUPERT.
PLANESCOPE.

No. 279,439. Patented June 12, 1883.

Attest;
Walter Fowler
H. B. Applewhaite

Inventor;
William W. Rupert
per:
Thomas P. Hirsey
atty.

UNITED STATES PATENT OFFICE.

WILLIAM W. RUPERT, OF POTTSTOWN, PENNSYLVANIA.

PLANESCOPE.

SPECIFICATION forming part of Letters Patent No. 279,439, dated June 12, 1883.

Application filed February 16, 1883. (No model.)

*To all whom it may concern:*

Be it known that I, WILLIAM WHITEHEAD RUPERT, a citizen of the United States, residing at the borough of Pottstown, county of Montgomery, and State of Pennsylvania, have invented a new and useful Improvement in Planescopes, of which the following is a specification.

My improvement relates to educational appliances, for the purpose of facilitating the study and making more clear to the average student the science of astronomy. As at present studied, without the use of a tellurian or orrery, it is extremely difficult to impress on the minds of the pupils the fact that the orbits of all the planets are inclined at an angle more or less acute with the plane of the ecliptic, and generally we find scholars have imbibed the idea that the heavens are an extensive flat with the planets revolving in concentric and horizontal paths around the sun. Having this idea, it is not to be wondered at that they should suppose that eclipses and transits should occur more frequently than they do, and would were these orbits in one horizontal plane.

My improved planescope enables a teacher to give a practical illustration of the movement of the earth and planets around the sun and of the moon around the earth; also, to show the eclipse of the sun and moon, the transit of Venus and Mercury, and why they can only occur at stated periods, and various other interesting phenomena connected with the study. I attain these objects by the use of the apparatus illustrated in the accompanying drawings, forming a part of this specification, in which similar letters designate similar parts.

Figure 1:
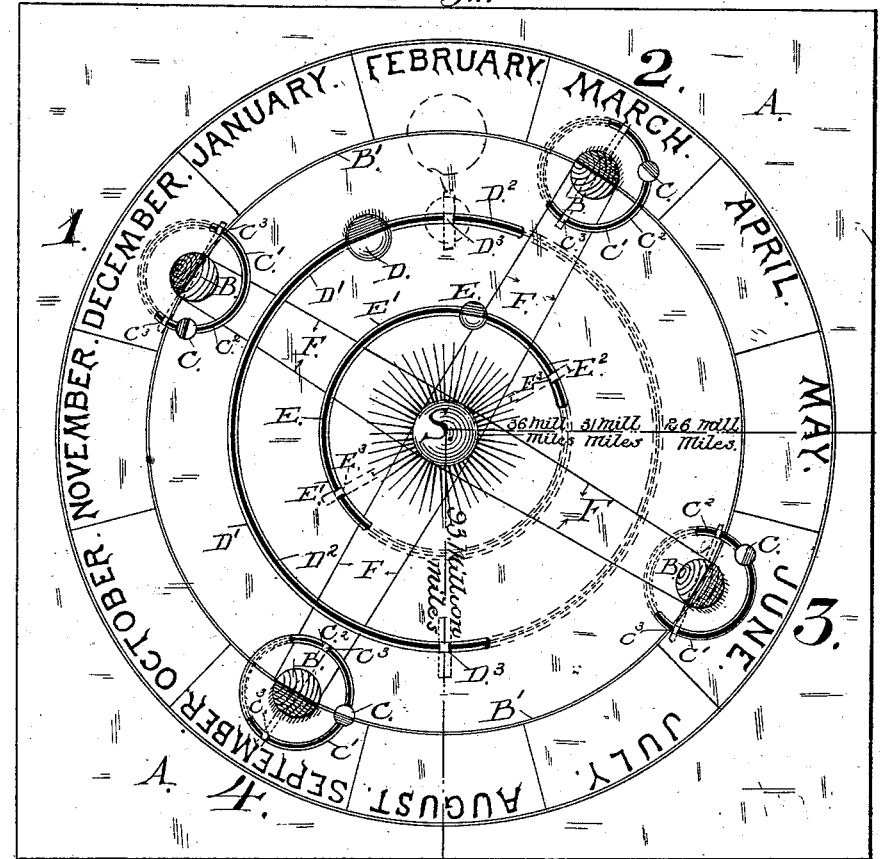
Figure 2:
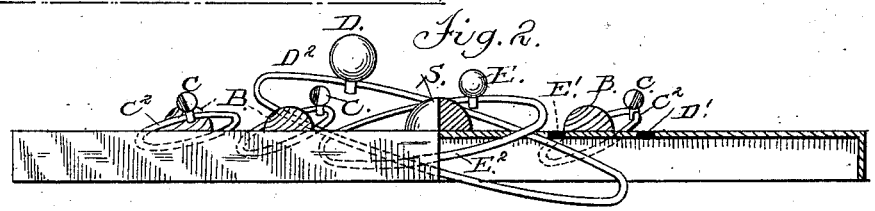
Figure 3:
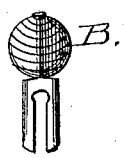

Figure 1 represents a plan of the apparatus arranged to exhibit the sun, moon, earth, Venus, and Mercury; Fig. 2, a half-elevation and half-section of the apparatus; Fig. 3, an elevation of one of the movable globes representing a planet, showing the mode of securing the same to the orbital rings.

A represents the foundation or ecliptic, upon which four hemispherical pieces, B, represent the earth, B' being the earth's orbit around the sun. C represents the moon; C', the perforation through the disk; $C^2$, the moon's orbit; $C^3$, the nodes. D represents the planet Venus; D', perforation of the disk; $D^2$, its orbital ring; $D^3$, its nodes. E represents the planet Mercury; E', perforation of disk; $E^2$, its orbital ring; $E^3$, its nodes. F represents the lines of the penumbra. 1 represents the earth in December; 2, in March; 3, in June; 4, in September. S represents the sun.

The construction of the apparatus is as follows: The foundation or ecliptic may be made of papier-maché, sheet-zinc, or tin, and would preferably be formed in a press which would be arranged, by a proper system of punches and dies, to raise upon the surface of the ecliptic a ring, B', representing the orbit of the earth, and four or more hemispheres upon said line to represent the earth; also, at the same operation, partially annular rings C', D', and E' would be perforated through the disk, as if for a stenciling-ring, and a central hemisphere, S, would be raised upon the same to represent the sun; or the hemispheres S and B may be soldered upon the disk, as may be found most convenient. Movable rings $C^2$, $D^2$, and $E^2$ are provided for the respective perforated circles C', D', and E', and are provided with axis or nodes central thereto, which, previous to closing their ends, are passed through these perforations, and the ends soldered together, making them continuous, care being taken to have the rings free to elevate on the proper side of the ecliptic at the angle of the planet whose path or orbit is to be exhibited. The axes or nodes of the rings are placed at the proper angle with relation to the sun and their position on the ecliptic, and are secured to the planescope's under face. The penumbra-lines may be raised upon the face by stamping, or they may be painted thereon in the after process of finishing up.

The globe C represents the moon, is movably mounted upon clamping-springs, which permit its application at any points on the orbital ring $C^2$ and the turning of the globe to catch the rays of the sun, so as to represent the different appearances of the moon.

The planet Venus (marked D) is also provided with the clamping device, and is immovable thereon. The orbit of the same being concentric with the sun, there is no change in its axial position required; the same with the planet Mercury E upon the ring $E^2$.

To add to the value of the planescope I mark between the orbits of the respective planets shown the distance in miles between them, which, added together, will give the total distance from the sun to the earth. I propose also to divide the earth's orbit into twelve equal parts and mark within said parts the name of its proper month.

The disk may be stiffened by a rim or flange and rendered more convenient for exhibition by having a handle attached to its under face, whereby it may be held in view of the class while explaining the movements of the heavenly bodies.

The operation of the planescope is as follows: Suppose we wish to show the transit of Venus. This can only occur when Venus is near her nodes, and therefore we will assume that the earth has changed its position from No. 4 and arrived at a point on the left in conjunction with the node of Venus, as shown in dotted lines on plan, Fig. 1, from which position the planet would be seen crossing the sun on the ascending path of its orbit, and at a point of the earth's orbit directly opposite. It would be seen on the descending path at any other points of its orbital movement—it would be carried either above or below the line of vision from the plane of the ecliptic. To represent an eclipse of the sun, we have only to shift the representative of the moon C to the node of its orbit in No. 2 or No. 4, when the three bodies being in conjunction an eclipse of the sun would occur. To show the phases of the moon, any of the positions Nos. 1, 2, 3, or 4 may be selected, and the representative of the moon C, which is painted one-half black, and revolves, as described, upon its clamping-axis, is turned upon its axis according to its orbital position to receive the light of the sun. With the observer's back to the sun and the moon directly in front of him he would see a full moon. A movement of forty-five degrees would disclose a three-fourths moon, and of ninety degrees from the original observation the last quarter or half-moon, while the new moon would occur within the penumbral lines and would not be visible. The conjunction of the planets may also be shown by shifting Venus and Mercury upon their respective orbits, so as to suit the position of the observer, which may be taken at the dotted point, from which point, both planets being on the ascending path, a conjunction would be possible. An eclipse of the moon can only occur when near her node, which must lie central to the penumbral lines to be apparent to an observer from the earth, and this fact is evident by an examination of No. 2 and No. 4, and shows clearly why it is that eclipses can only occur at those two points. The seasons are also determined by the several positions, orbital and axial, of the earth as it passes around the sun, and is clearly shown in Nos. 1, 2, 3, and 4 by the equatorial lines.

It will be apparent from the explanations given that the planescope will prove a great aid in elucidation of celestial and terrestrial phenomena, and that the principal may be expanded to embrace all the visible planets.

Having shown the application of my invention and its construction and use, I desire to secure by Letters Patent the following claims thereon:

1. As a new article of manufacture, a planescope, as described, consisting of a flat disk upon which are semi-annular concentric perforations, and oscillating freely therein rings having their axes secured to the under face of the disk, and having clamped on the same movable globes, fixed or revolving on their axes, a central hemispherical figure representing the sun, and a series of four or more hemispherical figures representing the earth, with a circle concentric with the sun for the earth's orbit, and penumbral lines drawn from the sun to the earth, respectively, as shown, and substantially as and for the purpose set forth.

2. A plate or disk, A, having arranged thereon at four or more points hemispherical pieces B, connected by a circular line stamped or painted thereon, a central hemispherical rim, S, and two or more circles, D' E', concentric therewith, stamped out of the disk, leaving parts unstamped for strength, also concentric with each hemisphere B, a concentric circle, C', partially perforated therein, in combination with the rings C² D² E², their nodes C³ D³ E³, the globes C D E, and the penumbral lines F, substantially as shown, and for the purpose set forth.

3. The globes C, D, and E, provided with spring-clamps, in combination with the orbital rings C² D² E², semi-perforations C', D', and E', disk A, hemispheres S and B, orbital line B', and penumbral lines F F, substantially as and for the purpose described.

WILLIAM WHITEHEAD RUPERT.

Witnesses:
MARK H. RICHARDS,
MILLER D. EVANS.